Sept. 5, 1933.   J. W. EASTER   1,925,956
ELECTRICAL CLUTCH
Filed Feb. 17, 1932   2 Sheets-Sheet 1

Inventor
J. W. Easter
By Bacon & Thomas
Attorneys

Sept. 5, 1933.   J. W. EASTER   1,925,956
ELECTRICAL CLUTCH
Filed Feb. 17, 1932    2 Sheets-Sheet 2

Inventor
J. W. Easter
By Bacon + Thomas
Attorneys

Patented Sept. 5, 1933

1,925,956

UNITED STATES PATENT OFFICE 1,925,956

ELECTRICAL CLUTCH

James W. Easter, Baltimore, Md.

Application February 17, 1932. Serial No. 593,657

7 Claims. (Cl. 192—84)

This invention relates to new and useful improvements in electric clutches designed primarily for use in motor propelled vehicles.

In my copending application for automatic electro-magnetic clutch and electric coasting devices, filed June 17, 1931, Serial No. 545,129, I have described and claimed an electro-magnetic clutch structure for use on motor vehicles and a system of control by means of which the clutch may be actuated automatically to relieve the operator of a vehicle equipped with this device of the necessity of manually actuating the clutch to permit of starting, stopping, changing gears, etc. This system of control, also, accomplishes automatic actuation of the clutch to permit coasting or free wheeling when the driven shaft overruns the drive shaft. In this former application, I have disclosed and described an electro-magnetic clutch structure which was especially designed without regard for the associated structures now in common use in commercial motor vehicles.

It therefore is the primary object of this invention to provide an electro-magnetic clutch structure which may be incorporated in substantially all types of commercial motor propelled vehicles without requiring any change in the fly wheel structure, the clutch housing, or the like. A further object of the invention is to provide an electro-magnetic clutch which will employ the conventional single clutch disk now in common use in automobile clutch structures.

Another object of the invention is to provide a clutch structure of the electro-magnetic type which will not add materially to the usual weight of the fly wheel and clutch assembly of the motor vehicle.

A still further and important object of the invention is to provide an electro-magnetic clutch which will automatically function to accomplish a remarkably smooth engagement and will entirely eliminate sharp engagement or "grabbing".

Figure 1:
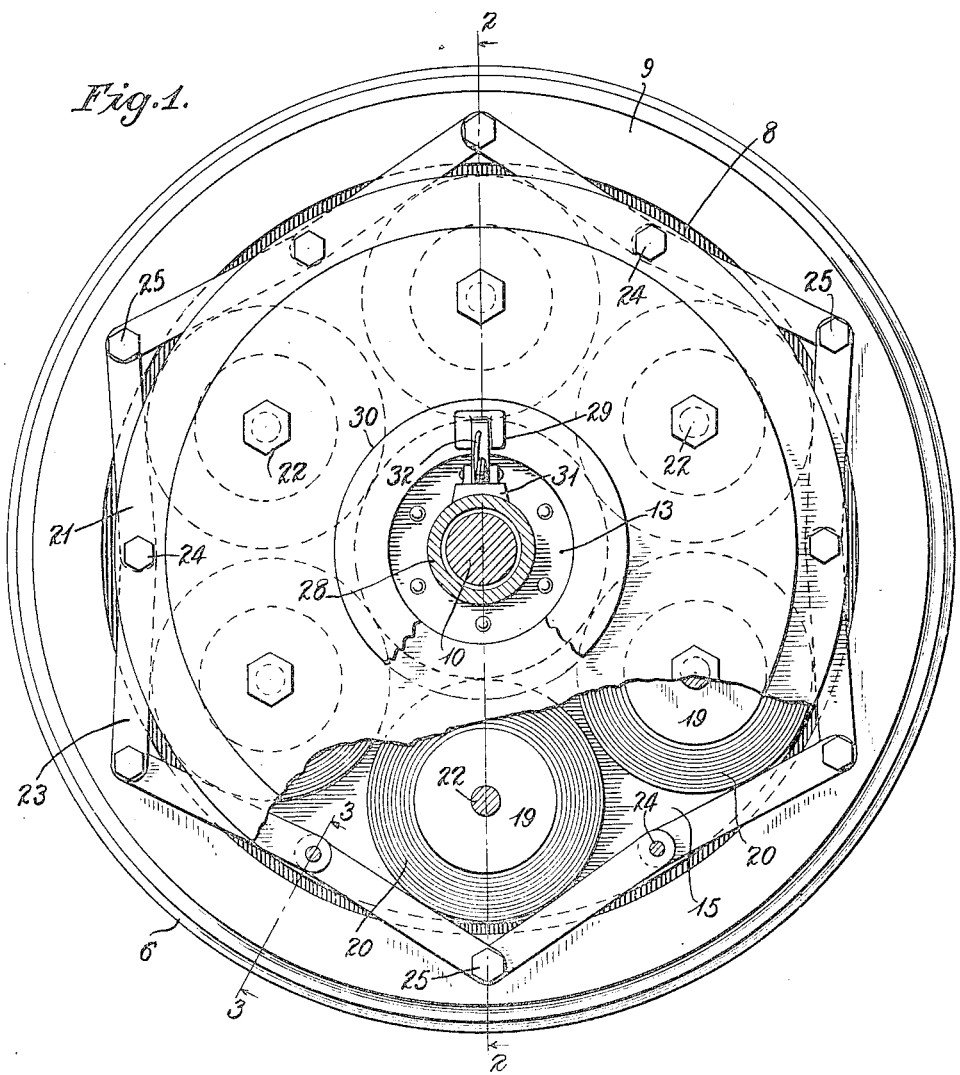
Figure 3:
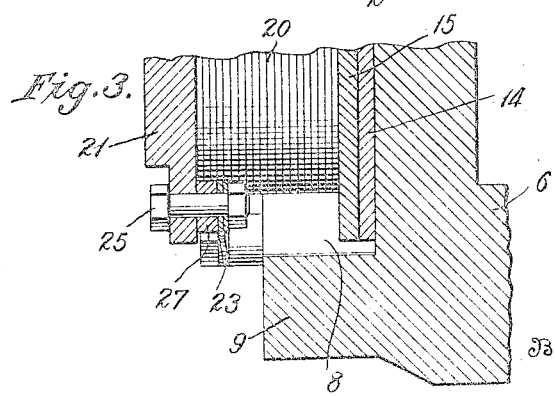
Figure 2:
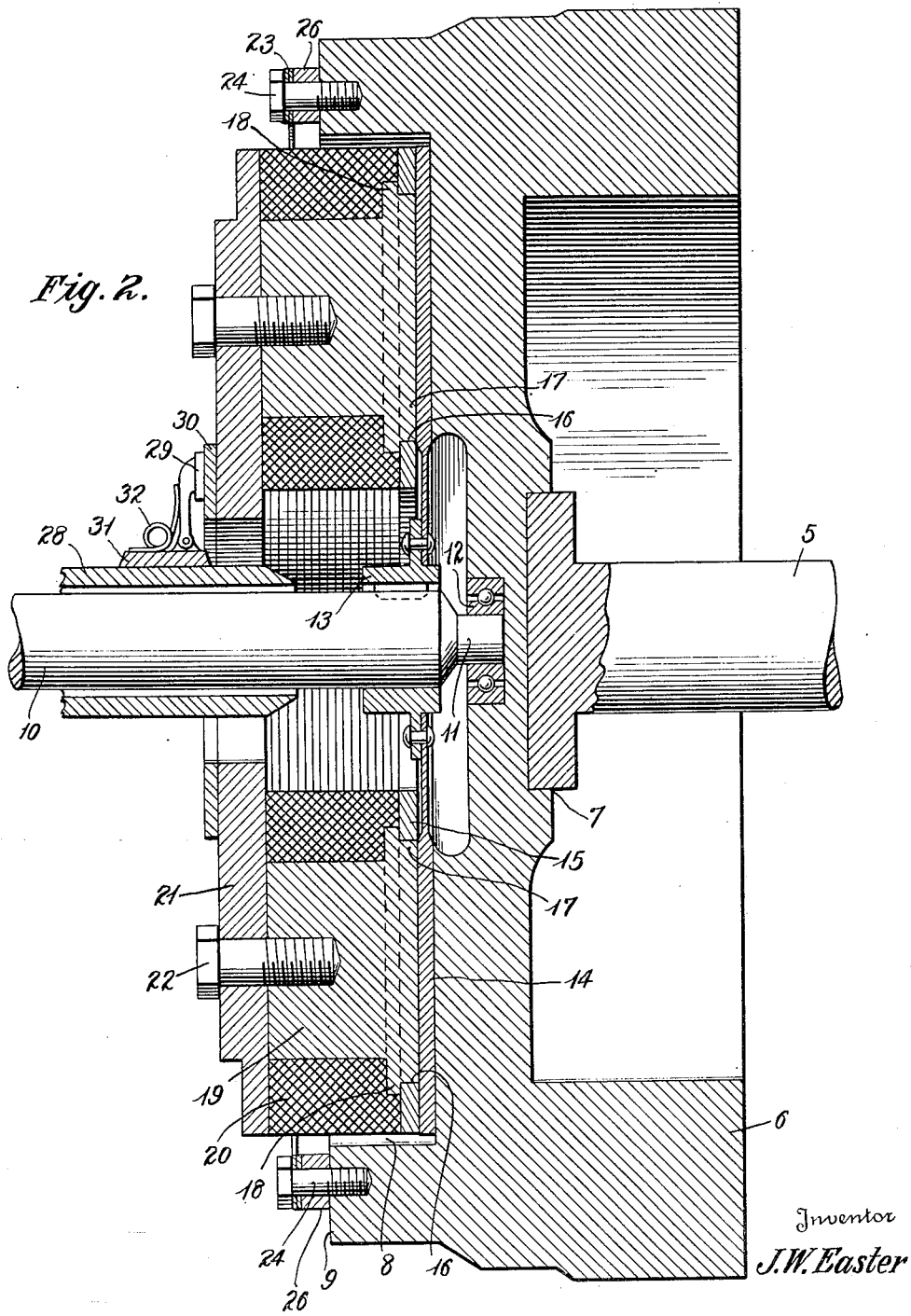

Other objects and advantages of the invention will be apparent during the course of the following description:

In the accompanying drawings forming a part of the specification, and in which like numerals are employed to designate like parts throughout the same, Figure 1 is a rear elevational view of the fly wheel and electro-magnetic clutch assembly embodying this invention, Figure 2 is a central vertical sectional view taken on line 2—2 of Fig. 1, and Figure 3 is a fragmentary sectional view taken on line 3—3 of Fig. 1.

In the drawings, wherein for the purpose of illustration is shown a preferred embodiment of this invention, the numeral 5 designates the drive shaft which, in an automobile assembly, will be the extension of the engine crank shaft. To the end of this drive shaft 5 is secured a fly wheel 6 by any suitable connection, as represented at 7. Practically all fly wheels now in common use in motor propelled vehicles have a cavity formed in the rear face thereof and this cavity is arranged concentrically with respect to the body of the fly wheel and the drive shaft to which the fly wheel is connected. This cavity is provided for receiving the usual clutch disk and the cavity also functions to house a considerable portion of the usual pressure plate and spring elements employed for applying pressure to the said plate. In the present assembly embodying this invention, this cavity formed in the rear face of the fly wheel 6 bears the reference character 8 and is formed by a rearwardly extending, peripheral flange 9.

The driven shaft 10 is illustrated as being formed with a reduced end 11 received in an anti-friction bearing structure 12 and mounted in the fly wheel 6. Fig. 2 of the drawings clearly discloses driven shaft 10 as having suitably splined or keyed thereto the hub 13 of the single clutch disk 14. It is to be understood that this clutch disk 14 is the disk ordinarily used in spring actuated automobile clutches and this disk is at least partially formed of iron. This fact becomes of importance in the operation of this clutch and will be explained more in detail at a later point.

The electro-magnetic portion of this clutch includes a pressure plate 15 which is formed of brass and is of substantially annular formation. This pressure plate is formed with a plurality of cylindrical openings 16 arranged in a circular series and adapted to receive the inner end portions 17 of an equal number of magnet core pieces. These core pieces are further formed with annular flanges 18 which bear against the inner face of the pressure plate. It is to be understood that these core pieces are secured to the pressure plate 15 in any desired manner, as by brazing, welding, or the like. The main body portion 19 of each core piece projects laterally from the pressure plate 15 and has suitably wound thereupon a magnet winding 20. It is to be understood that suitable insulation is employed to prevent grounding of these various coils. A metallic yoke ring 21, of annular formation, is secured to the outer ends of the various core pieces by means of lag bolts 22 which pass through the yoke ring and are threaded at their inner ends into the core pieces. These various magnetic coils with the pressure plate 15 and the yoke ring 21 are to be carried by the fly wheel 6 and must be permitted to move relative the fly wheel axially of the drive and driven shafts. For this reason, a plurality of spring steel suspension links or bracket members 23 are provided and are each connected at one end to the annular flange portion 9 of the fly wheel by means of a bolt 24 and at their second end to the yoke ring 21 by means of a bolt 25. The bolts 24 have positioned thereupon spacing blocks 26 which retain the ends of the members 23 in spaced parallelism with respect to the inner face of the fly wheel. A spacing block 27 also is provided for each one of the bolts 25 to retain the ends of the links 23 in spaced relation to the yoke ring. By inspecting the various figures, it will be seen that each one of the bolts 24 and 25 has connected thereto the ends of two adjacent suspension links 23. These links being formed of spring steel, will permit the pressure plate 15 with its attached magnets and cores to move relative the fly wheel 6. The normal position of the pressure plate will be such that no driving connection will be established between the fly wheel and the single clutch disk 14. This normal position of the pressure plate is assumed when no current is flowing through the windings of the various magnets. When the magnets are energized, the cores for the magnets will attract the fly wheel and, due to the yieldable suspension system provided for the core pieces and the pressure plate, this unit will be caused to move into clutch applying position with respect to the disk 14 and the fly wheel 6.

A tubular housing member 28 surrounds the driven shaft 10 and upon this housing member is mounted a brush 29 which is intended to make electric contact with a ring 30 secured to the yoke ring 21. The brush 29 is intended to be connected in any suitable way in the energizing circuit for the magnet coils. This brush 29 is mounted upon a base 31 and is provided with a pressure spring 32 which functions to retain the brush constantly in wiping engagement with the ring 30. The various magnet windings are intended to have one of their terminals connected either in series or parallel with this collector ring 30. The remaining terminal of each coil is intended to be grounded in any way desired. No novel form of connection is intended to be used, and for that reason is not shown.

As stated above, the fact that the clutch disk 14 is made partially of iron plays an important part in this invention. The magnetic attraction between the pressure plate 15 and the body of the fly wheel is directly proportioned to the square of the air gap between these two elements. The clutch disk is interposed in this air gap. While the disk and the fly wheel are rotating at sharply different speeds, the clutch disk will act as a magnetic shield between the pressure plate, or, in fact, the core pieces of the magnets, and the fly wheel, reducing the attraction between these core pieces and the fly wheel. When the clutch engages to such an extent that the fly wheel and clutch disk revolve at the same speed, the iron of the disk forms a path for the magnetic field of flux, thereby reducing the effective air gap and greatly increasing the clutch pressure. Due to the fact that the iron clutch disk acts as a shield between the core pieces of the magnets and the fly wheel when the clutch disk and the fly wheel are rotating at relatively high variable speeds, the result is that the clutch will refuse to engage sharply and a remarkably smooth engagement will be accomplished. With the pressure plate moved, due to attraction between the core pieces and the fly wheel, into full clutching engagement, the pressure between these various elements will be very great and no slippage will occur.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. An electro-magnetic clutch comprising a fly wheel, a drive shaft connected to the fly wheel, a driven shaft, a clutch disk connected to the driven shaft, a pressure plate resiliently connected to the fly wheel and operable to force the clutch disk into frictional engagement with the fly wheel, and electro-magnetic means carried by the pressure plate and attracted toward the fly wheel to actuate said plate.

2. A device of the type described, comprising a drive shaft, a fly wheel attached to the drive shaft, a driven shaft, a clutch disk attached to the driven shaft, and a pressure applying unit including electro-magnetic means resiliently suspended from the fly wheel and operable to drivingly connect the clutch disk and fly wheel.

3. A device of the type described comprising a driving member, a body attached to the driving member, a driven member, a friction element attached to the driven member, and electro-magnetic force creating means resiliently suspended from said body for movement relative thereto to force the friction element attached to the driven member into driving engagement with the said body.

4. A device of the type described comprising a drive shaft, a body attached to the drive shaft, a driven shaft, a friction disk attached to the driven shaft, a pressure plate, a plurality of magnet units carried by the pressure plate, and means for resiliently attaching the magnets and pressure plate to the said body so that energization of the magnets will cause the pressure plate to force the disk into driving engagement with said body.

5. A device of the type described comprising a drive shaft, a fly wheel attached to the drive shaft, a driven shaft, a clutch disk formed at least substantially of iron attached to the driven shaft, and electro-magnetic force creating means movably supported upon the fly wheel and operatively associated with the clutch disk for forcing the disk into driving engagement with the fly wheel.

6. A device of the type described comprising a drive shaft, a fly wheel having a friction surface formed thereon, a driven shaft, an iron clutch disk carried by the driven shaft and overlying the friction surface of the fly wheel, and electro-magnetic force creating means movably suspended from the fly wheel and positioned in operative relation with the outer face of the clutch disk for forcing said disk into driving engagement with the friction surface of the fly wheel.

7. A device of the type described comprising a drive shaft, a fly wheel attached to the drive shaft, a driven shaft, a clutch disk attached to the driven shaft, said fly wheel having a cavity formed in one face thereof and in which said disk is positioned, a magnetic clutch disk actuating unit positioned partially within the said cavity, and spring means for suspending the said unit from the fly wheel to permit relative movement between the unit and the fly wheel.

JAMES W. EASTER.